(12) United States Patent
Rudeseal et al.

(10) Patent No.: US 7,000,088 B1
(45) Date of Patent: Feb. 14, 2006

(54) SYSTEM AND METHOD FOR QUALITY OF SERVICE MANAGEMENT IN A PARTITIONED STORAGE DEVICE OR SUBSYSTEM

(75) Inventors: George A. Rudeseal, Boulder, CO (US); Robert F. Walsh, Boulder, CO (US); Stephen S. Selkirk, Westminister, CO (US)

(73) Assignee: Storage Technology Corporation, Louisville, CO (US)

( * ) Notice: Subject to any disclaimer, the term of this patent is extended or adjusted under 35 U.S.C. 154(b) by 437 days.

(21) Appl. No.: 10/330,838

(22) Filed: Dec. 27, 2002

(51) Int. Cl.
  *G06F 12/00* (2006.01)
(52) U.S. Cl. .......................... 711/173; 711/4; 711/112; 711/114; 711/158; 711/202; 711/203; 710/5; 710/36; 710/74; 710/244
(58) Field of Classification Search ................ 711/173, 711/158, 202, 203, 112, 114, 4; 710/5, 36, 710/74, 244
See application file for complete search history.

(56) References Cited

U.S. PATENT DOCUMENTS

| | | | |
|---|---|---|---|
| 4,607,346 A | 8/1986 | Hill | |
| 5,155,835 A | 10/1992 | Belsan | |
| 5,345,584 A | 9/1994 | Hill | |
| 5,410,666 A | 4/1995 | Nakano et al. | |
| 5,430,855 A | 7/1995 | Walsh et al. | |
| 5,506,986 A | 4/1996 | Healy | |
| 5,581,724 A | 12/1996 | Bensan et al. | |
| 5,632,012 A | 5/1997 | Belsan et al. | |
| 6,038,639 A | 3/2000 | O'Brien et al. | |
| 6,330,621 B1 | 12/2001 | Bakke et al. | |
| 6,434,631 B1 * | 8/2002 | Bruno et al. | 710/6 |
| 6,453,392 B1 * | 9/2002 | Flynn, Jr. | 711/151 |
| 6,487,562 B1 * | 11/2002 | Mason et al. | 707/205 |
| 2002/0032816 A1 | 3/2002 | Bakke et al. | |
| 2003/0225801 A1 * | 12/2003 | Devarakonda et al. | 707/205 |

OTHER PUBLICATIONS

Microsoft Computer Dictionary Fourth Edition, definition of "disk controller", p. 144, 1999.*
Gibson et al., "Strategic Directions in Storage I/O Issues in Large-Scale Computing," pp 779-793, ACM, Dec. 1996.*
Vogel et al., "Distributed Multimedia Applications and Quality of Service: A Survey," pp 1-17, Proceedings of the 1994 Conference of the Centre for Advanced Studies on Collaborative Research, Oct. 1994.*
Collins, Maurice William, DOE/NCAR Mass Storage Workshop, Dec. 8-9, 1977, pp. 95-112.

* cited by examiner

*Primary Examiner*—Stephen C. Elmore
(74) *Attorney, Agent, or Firm*—Brooks Kushman P.C.

(57) ABSTRACT

A direct access storage system includes at least one disk and a controller. The at least one disk physically may be partitioned into at least one first access performance partition and at least one other access performance partition. The controller may be configured to process I/O accesses to the first access performance partition without regulation and regulate I/O accesses to the at least one other access performance partition.

18 Claims, 5 Drawing Sheets

210

DELAY THE LOW PERFORMANCE I/O REQUEST
BY A GRADUATED DELAY COMPRISING A SUM OF
A MINIMUM DELAY, AND A BASE DELAY MULTIPLIED BY A
MEASURED RATE AND DIVIDED BY A THRESHOLD RATE

*Fig. 4A*

IS THERE AN ACCESS
RATE FOR THE FIRST ACCESS
PERFORMANCE PARTITION
?
— 212

*Fig. 4B*

IS THERE AN ACCESS
OPERATION RATE OF THE
AT LEAST ONE OTHER
PERFORMANCE PARTITION?
— 208

*Fig. 4C*

IS THE I/O REQUEST
EXCEEDING A
PREDETERMINED
ACCESS RATE?
— 208

*Fig. 4D*

IS THE DATA TRANSFER RATE
TO THE AT LEAST ONE OTHER
PARTITION EXCEEDING A
PREDETERMINED THRESHOLD?
— 208

*Fig. 4E*

IS THE AVERAGE RESPONSE TIME OF
THE I/O ACCESSES TO AT LEAST ONE
OTHER PARTITION EXCEEDING
A PREDETERMINED THRESHOLD?
— 208

*Fig. 4F*

SYSTEM AND METHOD FOR QUALITY OF SERVICE MANAGEMENT IN A PARTITIONED STORAGE DEVICE OR SUBSYSTEM

BACKGROUND OF THE INVENTION

1. Field of the Invention

The present invention relates to a system and a method for quality of service management for a partitioned storage device or subsystem.

2. Background Art

Data recording technologies continually increase the areal bit density available for single actuator storage devices. For conventional high performance, multi-user applications (or subsystems) the concentration of more data under fewer actuators challenges the usability of the capacity of the storage devices. The access rate specified for a multi-user subsystem can depend on a number of factors. The factors that determine the access rate can include the subsystem configuration, the configuration and transaction load of applications that access the subsystem, the degree of successful data caching between the application transaction and the subsystem storage device, and the amount of data stored under each actuator in the subsystem.

The specified access (or I/O performance) rate in connection with the access rate capacity of each storage device in the subsystem determines how many devices (or actuators) are to be implemented to satisfy the access rate specifications. In many conventional storage subsystems the minimum device configuration is determined by the number of actuators that are to be implemented. When the minimum device configuration is determined by the number of actuators, the subsystem can have excess storage capacity over what is required to meet the access rate specifications.

In many conventional storage subsystems, the replacement of older disk storage with new higher density disk storage is implemented via "volume folding" where the contents of smaller (older) storage devices are "folded" into a single storage device. Mapping a number of virtual partitions to a single physical partition is an example of volume folding. However, to operate within the subsystem access rate specifications the volumes that are folded into the single volume can not have a total access demand that exceeds the access capacity of the replacement single volume.

One conventional attempt at improving the performance of storage subsystems is storing frequently accessed data close to the center of the actuator stroke and the less frequently accessed data at the extremes of the actuator stroke. A data storage device can be virtually partitioned to match the actuator stroke to estimated dataset access densities. The access density is a measure of the relative number of virtual I/O's mapped onto physical I/O's. However, when the estimated dataset access densities are less than the actual dataset access densities, conventional data storage devices and data storage subsystems can experience difficulty managing device and subsystem partitioning and data storage operations can fail to operate in an efficient manner. Estimated access densities in conventional storage subsystem approaches are often exceeded due to application configuration changes, transaction load increases, and loading, reloading and backing up datasets that have low expected access density. The conventional subsystem administrator (or controller) may be unable to utilize excess capacity under the actuator while maintaining adequate system performance during higher demand. Overall performance of conventional data storage devices and data storage subsystems can be suboptimal.

Thus, there exists a need for a storage subsystem that utilizes excess storage capacity without degrading the access rate, optimizes the access density, and provides specified quality of service to all of the storage partitions.

SUMMARY OF THE INVENTION

Accordingly, the present invention provides an improved system and an improved method for partitioning and access (i.e., storage to and retrieval from) quality of service management of a data storage subsystem. The present invention may implement a controller having a governor configured to ensure that lower priority service level partitions cannot consume more of the physical volume capacity than allocated per the subsystem specifications, regardless of demand to the lower priority service level partitions, thereby enhancing system performance.

According to the present invention, a direct access storage system is provided comprising at least one disk physically partitioned into at least one first access performance partition and at least one other access performance partition, and a controller configured to process I/O accesses to the first access performance partition without regulation e.g., I/O accesses to the first access performance partition do not experience any controller imposed delay, and regulate I/O accesses to the at least one other access performance partition, e.g., I/O accesses to the at least one other access performance partition may experience a controller imposed delay.

Also according to the present invention, a method of ensuring I/O access performance in a direct access storage system is provided, the method comprising physically partitioning at least one disk into a first access performance partition and at least one other access performance partition, processing I/O accesses to the first access performance partition without regulation, and regulating processing I/O accesses to the at least one other access performance partition.

Further according to the present invention, for use in a direct access storage system, a controller is provided comprising at least one first access performance virtual partition, at least one other access performance virtual partition, and a governor configured to process I/O accesses to the first access performance partition without regulation and regulate I/O accesses to the at least one other access performance partition such that a predetermined quality of service is delivered (or managed).

The above features, and other features and advantages of the present invention are readily apparent from the following detailed descriptions thereof when taken in connection with the accompanying drawings.

BRIEF DESCRIPTION OF THE DRAWINGS

FIG. 4A is an alternative embodiment of a step of the flow diagram of FIG. 4;

FIG. 4B is an alternative embodiment of a step of the flow diagram of FIG. 4;

FIG. 4C is an alternative embodiment of a step of the flow diagram of FIG. 4;

FIG. 4D is an alternative embodiment of a step of the flow diagram of FIG. 4;

FIG. 4E is an alternative embodiment of a step of the flow diagram of FIG. 4; and FIG. 4F is an alternative embodiment of a step of the flow diagram of FIG. 4.

DETAILED DESCRIPTION OF THE PREFERRED EMBODIMENT(S)

Figure 1:
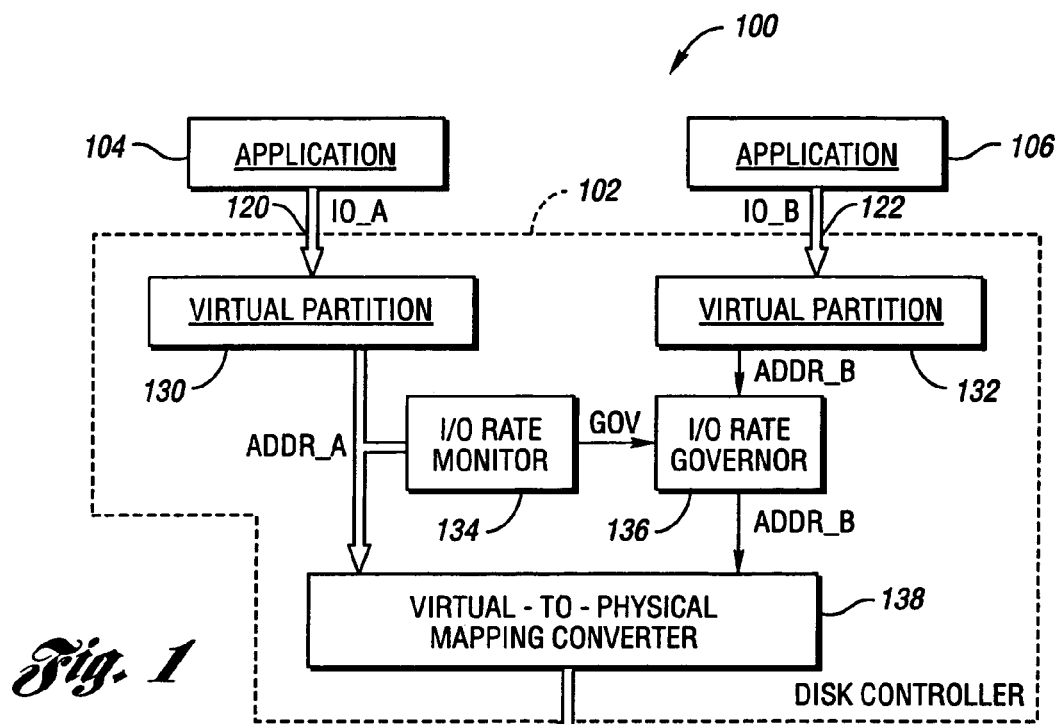
FIG. 1 is a diagram of a disk access system of the present invention.

With reference to the Figures, the preferred embodiments of the present invention will now be described in detail. Generally, the present invention provides an improved apparatus and an improved method for partitioning and access (i.e., storage to and retrieval from) quality of service management of a data storage subsystem. The data storage subsystem may comprise a single storage device or a group of similar storage devices. The storage devices implemented according to the present invention generally comprise at least one direct access storage device (DASD). The storage devices implemented according to the present invention may comprise a redundant array of inexpensive disks (RAID). When the data storage subsystem comprises a group (or pool) of storage devices (e.g., a RAID), the storage devices are generally similar (i.e., not dissimilar) storage devices.

The present invention generally provides for partitioning virtual devices (or files in the storage subsystem file system) according to at least one minimum access density specification. In one example, the present invention may be implemented as at least one high capacity storage device that comprises virtually partitioning of a number of folded devices. The storage subsystem of the present invention is generally implemented having at least two levels (e.g., a higher level and a lower level) of access priorities. The present invention is generally configured to manage resources of the storage subsystem such that during normal (e.g., non-failure, non-test, etc.) modes of operation, the storage subsystem approaches, meets or exceeds the at least one minimum access density specification. When subsystem partitions are each implemented having different minimum access density specifications, the present invention generally provides the specified level (or quality) of service to each of the partitions.

The present invention generally comprises an improved apparatus and an improved method for allocating the access capacity of the at least one physical volume to respective virtual device partitions such that the physical actuators are not over-committed (i.e., unable to meet the respective access rate specifications). In one example, the present invention may implement a controller having a governor configured to ensure that lower priority service level partitions cannot consume more of the physical actuator capacity than allocated per the subsystem specifications, regardless of demand to the lower priority service level partitions. When the governor is configured to ensure that lower priority service level partitions cannot consume more of the physical actuator capacity than allocated per the subsystem specifications, overloading of the higher level partitions will generally be reduced or prevented for any level of I/O access load.

In another example, the controller may be implemented having a governor that may be configured such that lower service priority partitions may consume any amount (or level) of resources whenever no higher level priority accesses are made to the subsystem. When the governor is configured such that lower service priority partitions may consume any level of resources, the governor may also be configured to ensure that higher level priority accesses may interrupt the lower level service priority accesses such that the specifications for the higher level priority accesses are met. For example, a high performance access monitor may be included in the controller.

The present invention generally provides more effective access to and from a larger portion of the available capacity of high (e.g., greater than 9 GB) capacity storage devices than conventional partitioning approaches. The apparatus and method of the present invention generally maintain (or manage) a predetermined high quality of service to high performance level partitions in the respective virtual (and respective physical) devices while implementing the data storage subsystem via similar physical storage devices.

Referring to FIG. 1, a diagram illustrating a storage device access control system 100 in accordance with a preferred embodiment of the present invention is shown. The system 100 may be implemented in connection with a disk based storage (or archival) system such as a RAID system or any appropriate direct access storage device (DASD) based storage system to meet the design criteria of a particular application.

The system 100 generally comprises a controller 102, at least one application (or program) (e.g., application 104) having a particular specified (or predetermined) level (or threshold) of access performance (e.g., a given quality of service standard), another application (or program) (e.g., application 106) having another particular specified (or predetermined) level (or threshold) of access performance. (e.g., another given quality of service standard) that is generally lower than the performance specification that corresponds to the application 104, and at least one disk or DASD 108*a*–108*m* (where m is a number selected such that one disk 108*a* or a plurality of disks 108*a*–108*m* are provided to meet the storage capacity design criteria of a particular application).

The at least one application 104 may have a high performance (or quality of service) specification (or standard) relative to the at least one application 106 performance specification (or standard). The applications (e.g., programs, routines, etc.) 104 and 106 generally correspond to disk access (i.e., read, write, store, retrieve, etc.). The performance specifications that correspond to the applications 104 and 106 are generally related to disk access (e.g., access time), operations (or commands processes) per unit of time, and data transfer (e.g., Mb per time unit). The disk 108*a* (or alternatively, the disks 108*a*–108*m*) is generally implemented as a virtually partitioned physical disk. The disks 108*a*–108*m* may be coupled in a striping or mirroring configuration. Each of the disks 108*a*–108*m* has a respective actuator and each actuator operates having a stroke.

The controller 102 may have an input 120 that may receive at least one signal (e.g., IO_A) from the application 104, an input 122 that may receive at least one signal (e.g., IO_B) from the application 106, and an output 124 that may present at least one signal. (e.g., DISK_ADDR_A, DISK_ADDR_B) to the drive 108 disk 108*a* (or, alternatively, the disks 108*a*–108*m*). The signals IO_A and IO_B generally comprise access commands and respective data streams. The signals IO_A and IO_B are generally implemented having a configuration (i.e., format, block structure, etc.) that is appropriate to meet the design criteria of the particular application where the system 100 is implemented.

The signals DISK_ADDR_A and DISK_ADDR_B may correspond to (or relate to) the signals IO_A and IO_B, respectively. The signals DISK_ADDR_A and DISK_ADDR_B are generally implemented as physical disk memory addresses within the disk 108a (or, alternatively, the disks 108a–108m) and the corresponding commands and data that may be stored at locations referenced by the respective addresses.

The controller 102 is generally configured using compiled software (i.e., one or more routines of object code), compiled firmware, i.e., one or more routines of object code, hardware logic that has been rendered into a packaged format, or any combination thereof. In one example, the controller 102 generally comprises at least one virtual partition 130 that is not regulated, at least one virtual partition 132, an access (or I/O) rate monitor 134, at least one access (or I/O) rate governor 136 that regulates the at least one virtual partition 132, and a virtual-to-physical mapping converter 138. The partition 130 may have an input that may receive the signal IO_A and an output that may present a signal (e.g., ADDR_A). The partition 132 may have an input that may receive the signal IO_B and an output that may present a signal (e.g., ADDR_B). In one example, the partition 130 may be implemented having a high performance access specification (e.g., agreement, standard, etc.) relative to the at least one partition 132. The signals ADDR_A and ADDR_B may be memory addresses that correspond to the memory locations where the signals (i.e., commands or data) IO_A and IO_B, respectively, are stored (or written to) and read from (or retrieved from) in the virtual partitions 130 and 132, respectively, and the corresponding commands and data. The partitions 130 and 132 may be configured to convert (or translate) the signals IO_A and IO_B to the signals ADDR_A and ADDR_B, respectively.

The monitor 134 may have an input that may receive the signal ADDR_A and an output that may present a signal (e.g., GOV). The signal GOV may be a control signal. The monitor 134 may be configured to monitor (or record, track, etc.) the access performance (or quality of service) of the partition 130 via the access rate of the signal ADDR_A. The monitor 134 may be configured to present (or assert) the signal GOV when the access performance of the partition 130 (and therefore the access performance of the application 104) meets or exceeds a predetermined specification threshold (e.g., a high performance threshold relative to a performance threshold of the application 106 and the partition 132). The monitor 134 generally asserts the signal GOV when the partition 130 is idle or the respective (i.e., high) access performance is being met. The controller 102 generally processes the signals IO_A without delay or regulation to ensure that the high performance specification is met.

The governor 136 may have an input that may receive the signal ADDR_B, an input that may receive the signal GOV, and an output that may present the signal ADDR_B. The governor 136 may be configured to present the signal ADDR_B in response to assertion of the signal GOV. When the performance criteria for the application 104 are being met or exceeded, the monitor 134 generally presents the signal GOV to the governor 136 and the governor 136 generally presents the signal ADDR_B. When the performance criteria for the application 104 are not being met, the monitor 134 generally de-asserts the signal GOV and the governor 136 generally holds the signal ADDR_B. The governor 136 generally limits the access rate of the low performance signals IO_B to ensure that the high performance signals IO_A have adequate system resources to meet the corresponding performance specification threshold. Operation of the governor 136 is discussed in more detail in connection with FIGS. 4 and 4A–4F.

The converter 138 may have an input that may receive the signal ADDR_A, an input that may receive the signal ADDR_B, and an output that may present the signals (DISK_ADDR_A and DISK_ADDR_B). The converter 138 is generally configured to convert (or map) the signals ADDR_A and ADDR_B to the respective signals DISK ADDR_A and DISK ADDR_B.

The disk 108a may receive the signals DISK_ADDR_A and DISK_ADDR_B. The disk 108a generally comprises a high performance rate physical partition 150 and at least one low performance rate physical partition 152. The signals DISK_ADDR_A and DISK_ADDR_B generally correspond to the partitions 150 and 152, respectively. In one example, the partition 150 may be implemented as an area (or region) at the periphery of the disk 108a or at or near the center of the stroke for the disk 108a actuator such that seek times are shorter than for other disk partitions. The at least one partition 152 may be implemented as an area centrally located on the disk 108a or at the extremes of the actuator strokes. Due to head mechanism (or actuator) design criteria, disk regions in the periphery of the disk are generally implemented having more rapid disk access than regions that are more interior on the disk.

Figure 2:
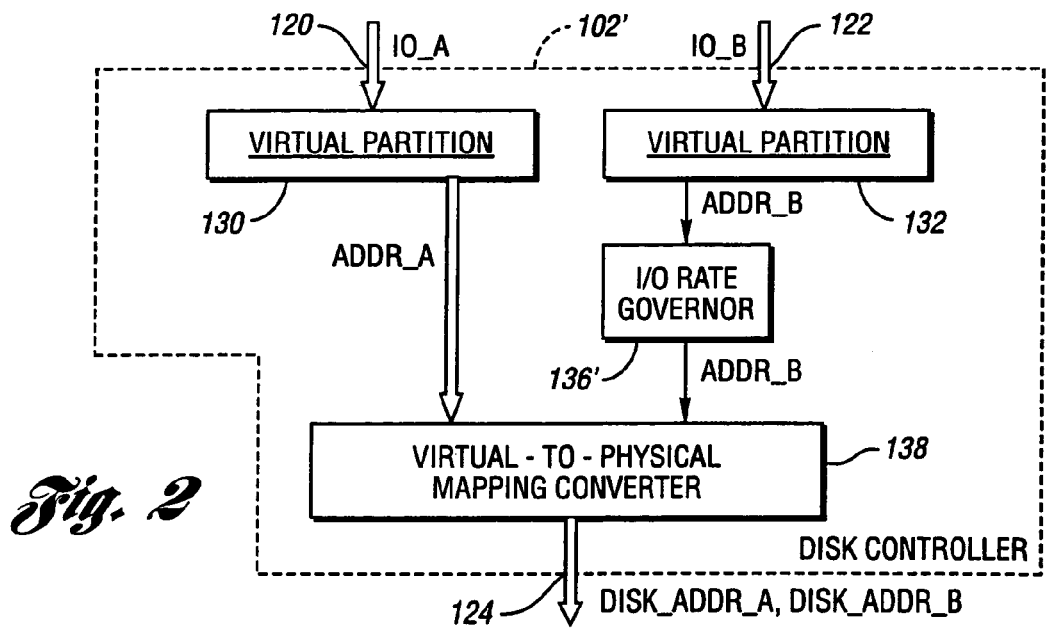
FIG. 2 is a diagram of an alternative embodiment of the disk access system of the present invention.

Referring to FIG. 2, a diagram of a controller 102' in accordance with an alternative embodiment of the present invention is shown. The controller 102' may be implemented similar to the controller 102. The controller 102' may be implemented without the monitor 134. The controller 102' generally comprises a governor 136'. The governor 136' may be configured to restrict operation of the lower performance partition 132 to a predetermined (or specified) maximum operation rate (or rates) irrespective of the actual operation rate (or performance) of the high performance partition 130. Operation of the governor 136' is discussed in more detail in connection with FIG. 5.

Figure 3:
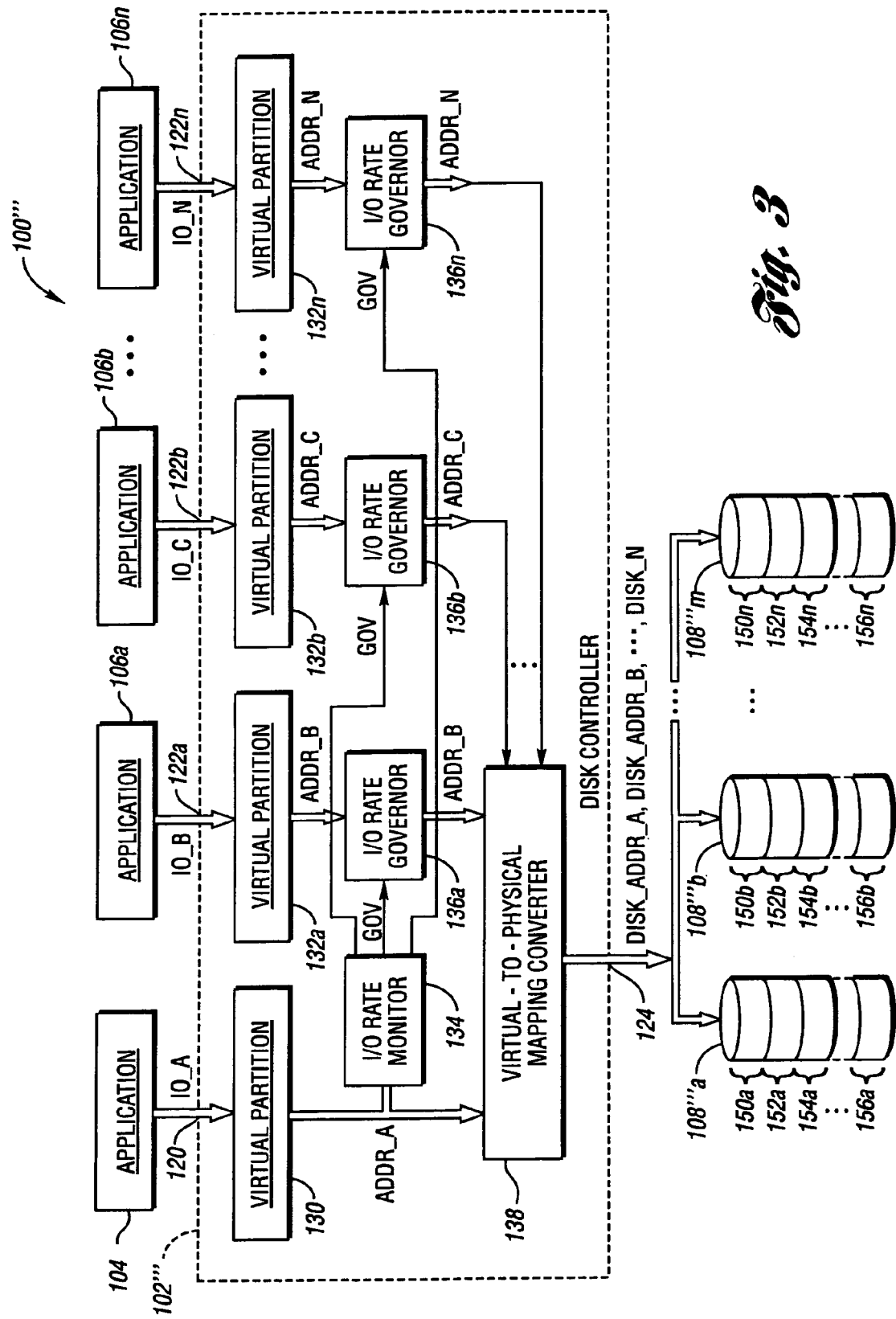
FIG. 3 is a diagram of another alternative embodiment of the disk access system of the present invention.

Referring to FIG. 3, a diagram of a system 100''' in accordance with an alternative embodiment of the present invention is shown. The system 100''' generally comprises a controller 102''', a number of applications 106 (e.g., applications 106a–106n), and at least one disk 108''' (e.g., disks 108'''a–108'''m). The applications 106a–106n are generally implemented as low priority applications when compared to the application 104. In an alternative example (not shown), the system 100''' may be implemented having a number of high priority applications 104 (e.g., applications 104a–104n), respective partitions 130 (e.g., partitions 130a–130n), and respective monitors 134 (e.g., monitors 134a–134n) that each present a respective control signal GOV (e.g., signals GOVa–GOVn) to all of the governors 136 to ensure that all of the higher performance specification application access standards are met.

The controller 102''' is generally implemented similar to the controller 102. The controller 102''' generally comprises partitions 132a–132n coupled to respective applications 106a–106n and a governor 136 coupled to each partition 132a–132n (e.g., respective governors 136a–136n). In another example (not shown), the controller 102''' may be implemented without a monitor 134 and may comprise respective governors 136' for each partition 132. Access prioritization (or arbitration) between the applications 106a–106n (or, alternatively, the applications 104a–104n) is generally implemented similarly to the prioritization between the applications 104 and 106 as implemented in connection with the system 100 of FIG. 1. For example, each application 106 (or, alternatively, each application 104) may have a predetermined performance specification that is used as the basis for access prioritization. When subsystem partitions related to each application 106 (or, alternatively, each application 104) are implemented having different minimum access density specifications, the system 100''' of the present invention generally provides the specified level (or quality) of service to each of the partitions.

The disks 108'''a–108'''m are generally implemented similar to the disk 108. The disks 108'''a–108'''m may each comprise respective physical partitions 150, physical partitions 152, and additional lower performance rating physical partitions (e.g., partitions 154–156) that are generally implemented similar to the partitions 152. The number of additional partitions 154–156 that are implemented in each of the disks 108''' generally corresponds to the number of additional applications 106 (e.g., applications 106b–106n) that are implemented in the system 100'''.

Figure 4:
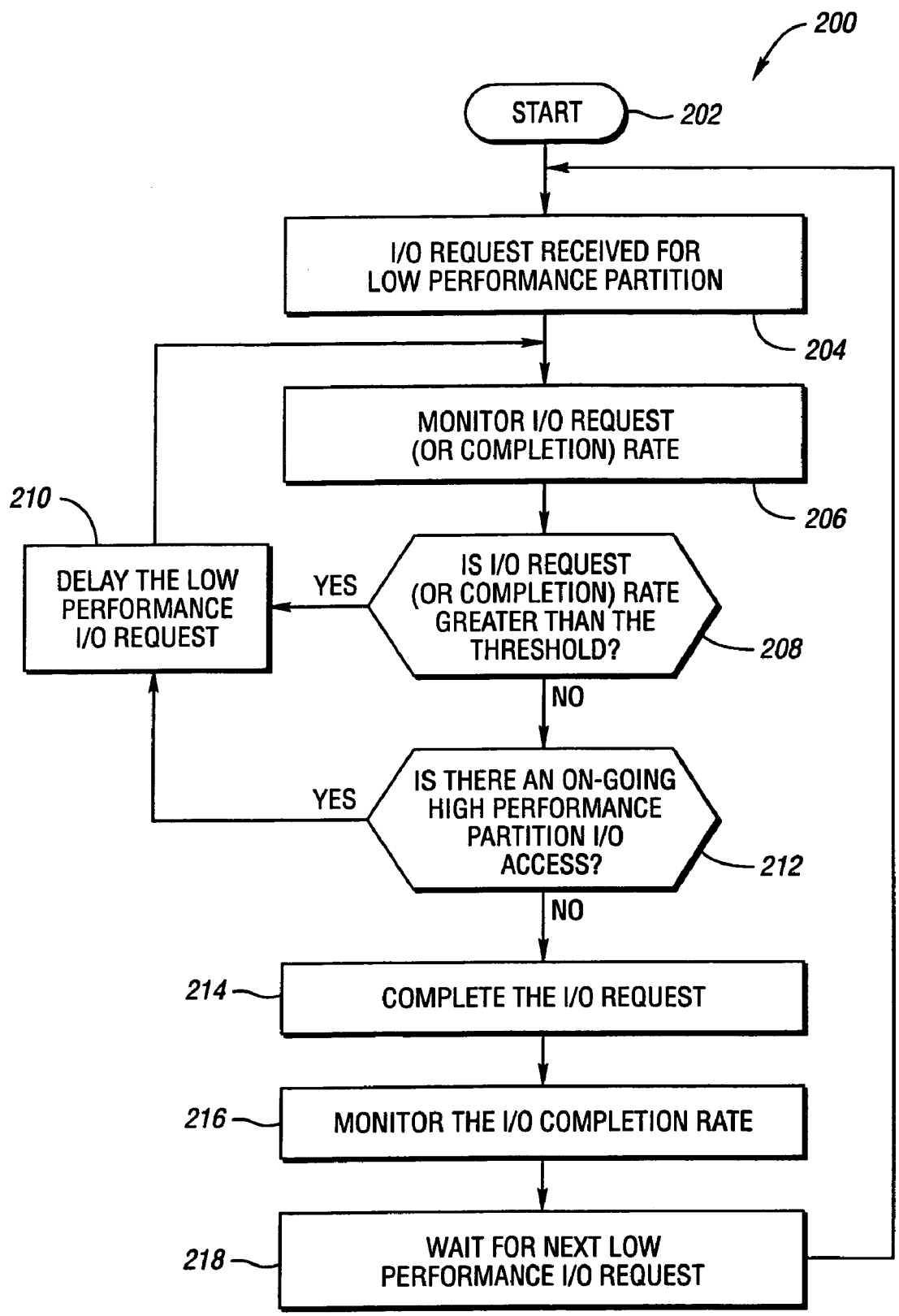
FIG. 4 is a flow diagram of an operation of the controller of the system of FIG. 1.

Referring to FIG. 4, a flow diagram illustrating an operation 200 of the controller 102 is shown. The operation (e.g., procedure, process, routine, steps, method, etc.) 200 may correspond to prioritization of the high performance and low performance I/O accesses using the system 100.

The method 200 generally starts (block 202) and when an I/O request (e.g., a signal IO_B) for a lower performance virtual partition 132 is received (block 204), the method 200 monitors (or determines) the respective I/O request rate (block 206). For example, the governor 136 may generate and save statistics such as the recent (e.g., the last x cycles, where x is a number determined to ensure access accuracy) I/O rate in operations per second, or the data rate in megabytes per second. The statistics may correspond to requests from the application programs 106 or, preferably, the rate of completion of the operations on the back end disk drives (i.e., disk drives 108b–108m, when implemented).

The monitoring of the low performance partition 132 used by the governor 136 to determine when to delay (or slow down) the respective I/O operations (e.g., processing the signal IO_B) may include:

(i) Response to the signal GOV. A simple detection of I/O activity (e.g., presentation of a signal IO_A) or no I/O activity by the monitor 134 and the corresponding assertion or de-assertion of the signal GOV. The low performance partition 132 may be regulated by the monitor 134 when there is activity, and not regulated when there is no activity.

(ii) Recording recent (e.g. within x cycles) I/O operation rate (e.g., an I/O access rate in I/O accesses per second).

(iii) Recording recent data transfer rates (e.g. Megabytes per second transferred for the most recent cycles or y seconds, where y is time selected to ensure accurate access).

(iv) Recording recent average response time of transactions (e.g., average response time of I/O accesses, completions, etc.).

(v) A record of whether or not the rates or response times were above or below the threshold set for the service level agreement for the high performance virtual partition 130.

The governor 136 may implement either fixed delays or, alternatively, graduated delays for processing the signal IO_B. For example, there may be a single fixed delay, and the governor 136 may determine whether or not to invoke the delay. In another example, the governor 136 may implement a graduated variable or delay, where the graduated delay is calculated using a formula based on an amount by which the monitored value exceeds the specified threshold.

In one example, a graduated delay may be calculated by the following expression:

$$\text{Delay} = \text{MinimumDelay} + \text{BaseDelay} * (\text{MeasuredRate}/\text{Threshold Rate})$$

In yet another example, the governor 136 may be implemented having multiple thresholds (e.g., a unique threshold for each respective application 104 and 106) and having a different fixed delay value for each threshold. Multiple thresholds, each having a different delay may be implemented via a look up table (LUT) instead of performing a calculation as above.

The high and low performance thresholds may be fixed numbers set (or predetermined) by a user configuring the system 100. However, in a preferred mode an estimated value may be calculated based on the specific configuration of the storage system 100. For example, an estimate of the available maximum I/O rate possible may be calculated based on the number of disk drives 108 in the system 100 and the number of data channels (not shown) available. The resulting total rate available may be divided into two (i.e., the number of partitions implemented) and allocated to different virtual partitions. The low performance partition may use the estimated rate that has been allocated to determine the threshold to use in the governor 136.

Referring to FIGS. 4 and 4A–4F, the method 200 (e.g., the governor 136) may, for example, decide whether the respective I/O request rate (or, alternatively, the I/O completion rate) is greater than the respective predetermined low performance threshold rate, whether there is an access operation rate for the low performance partition, whether the I/O request is exceeding a predetermined access rate, whether a data transfer rate to the low performance partition is exceeding a predetermined threshold, or whether an average response time of the I/O accesses to the low performance partition is exceeding a predetermined threshold (decision block 208). When such a condition is met, the method 200 may delay the I/O request (block 210) and return to the block 206. Returning to the decision block 208, when such a condition is not met, the method 200 may determine whether there is an access rate for the high performance partition or whether there is an on-going high performance I/O access (e.g., whether or not a signal IO_A has been received and is being processed by the controller 102, block 212). The decision block 212 may allow the low performance 132 partition to use more of the system 100 resources if the high performance partition 130 is not currently active, or is underutilizing the system 100 resources.

Referring again to FIG. 4, when there is no on-going high performance I/O access, the method 200 may complete the low performance I/O request (block 214). When the method 200 has completed the I/O request, the method 200 may monitor the I/O completion rate similarly to the I/O access rate (block 216), wait for the next low performance I/O request (block 218), and return to the block 204. Returning to the decision block 212, when there is an on-going high performance I/O access, the method 200 may transition to the block 210 and delay the low performance I/O request accordingly.

Figure 5:
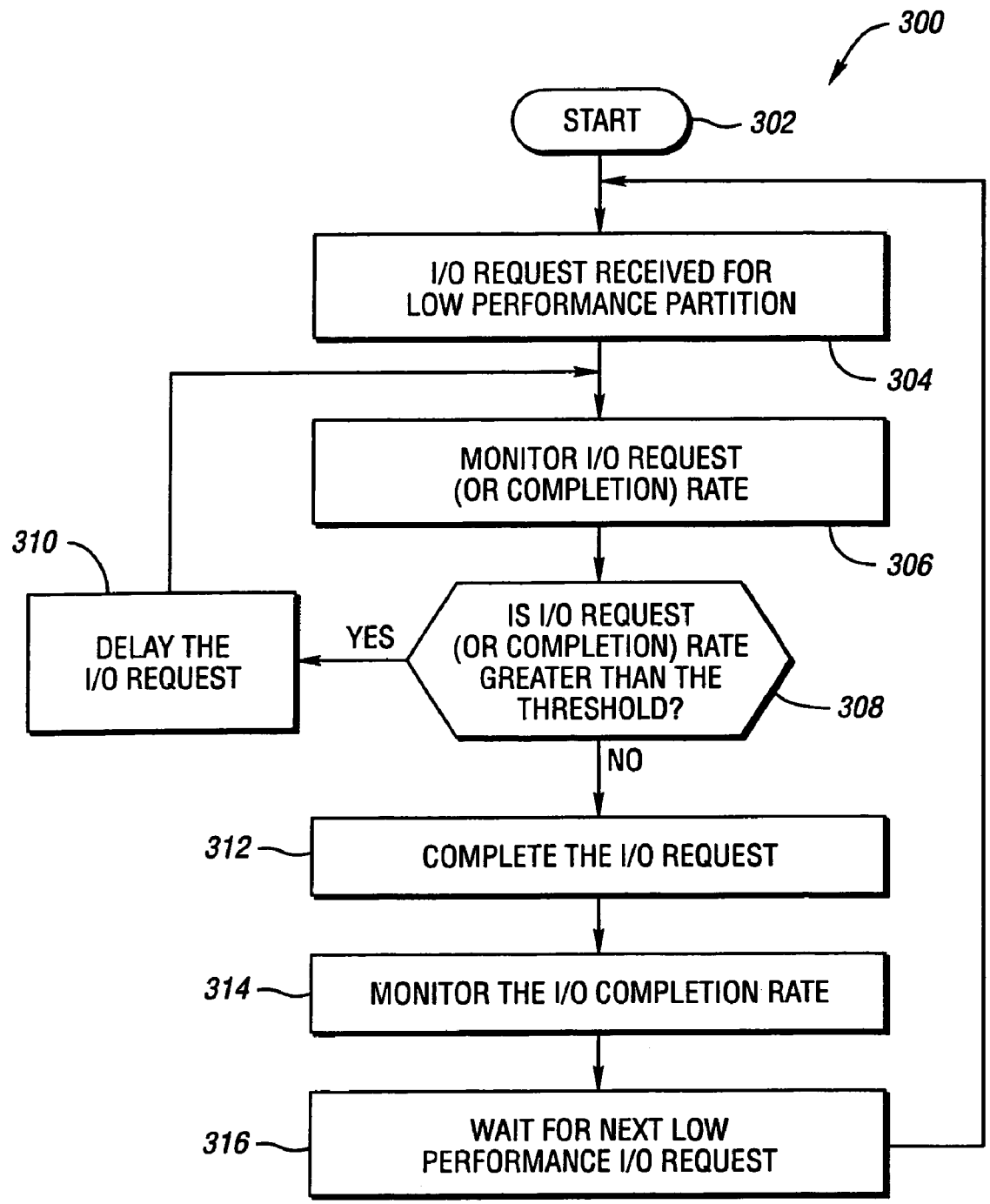
FIG. 5 is a flow diagram of an operation controller of the system of FIG. 2.

Referring to FIG. 5, a flow diagram illustrating an operation 300 of the controller 102' is shown. The operation (e.g., procedure, process, routine, steps, method, etc.) 300 generally starts (block 302) and when an I/O request (e.g., a signal IO_B) for a lower performance virtual partition 132 is received (block 304), the method 300 monitors (or determines) the respective I/O request (or access) rate (block 306) (e.g., via the governor 136').

The method 300 (e.g., the governor 136') may determine whether or not the respective I/O request rate (or, alternatively, the I/O completion rate) is greater than the respective predetermined threshold rate (decision block 308). When the low performance I/O request (or completion) rate exceeds the threshold rate, the method 300 may delay the I/O request (block 310) and return to the block 306. Returning to the decision block 308, when the I/O request (or completion) rate is less than the threshold rate, the method 300 may complete the I/O request (block 312).

When the method 300 has completed the I/O request, the method 300 may monitor the I/O completion rate (block 314), wait for the next low performance I/O request (block 316), and return to the block 304. In the controller 102' the low performance partition 130 will generally be restricted to a specified maximum operation rate irrespective of the operation rate of the high performance partition.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A direct access storage system comprising:
   at least one disk physically partitioned into at least one first access performance partition and at least one other access performance partition; and
   a controller configured to process I/O accesses to the first access performance partition without regulation and regulate I/O accesses to the at least one other access performance partition, wherein the controller determines an access rate for the first access performance partition and presents a control signal configured to regulate the I/O accesses to the at least one other access performance partition in response to the access rate for the first access performance partition.

2. The system of claim 1 wherein the first access performance partition is a high level performance partition compared to the at least one other access performance partition.

3. The system of claim 1 wherein regulation of access to the at least one other access performance partition comprises delaying access to the at least one other access performance partition when an access to the first access performance partition is being processed.

4. The system of claim 1 wherein the at least one disk comprises a plurality of similar disks.

5. The system of claim 1 wherein the I/O accesses to the at least one other partition are delayed when the I/O accesses to the at least one other partition exceed a predetermined threshold.

6. The system of claim 5 wherein the delay is a graduated delay comprising a sum of a minimum delay, and a base delay multiplied by a measured rate and divided by a threshold rate.

7. The system of claim 1 wherein the controller further comprises a first virtual partition configured to receive the accesses to the first access performance partition and at least one other virtual partition configured to receive the accesses to respective other performance partitions, wherein the controller is configured to convert the respective I/O accesses to respective virtual addresses.

8. The system of claim 7 wherein the controller further comprises a converter configured to convert the virtual addresses to respective physical disk addresses.

9. The system of claim 1 wherein the I/O accesses to the at least one other performance partition are regulated in response to an access operation rate of the at least one other performance partition.

10. A method of ensuring I/O access performance in a direct access storage system, the method comprising:
    physically partitioning at least one disk into a first access performance partition and at least one other access performance partition;
    processing I/O accesses to the first access performance partition without regulation;
    regulating processing I/O accesses to the at least one other access performance partition;
    determining an access rate for the first access performance partition; and
    regulating the I/O accesses to the at least one other access performance partition in response to the access rate for the first access performance partition.

11. The method of claim 10 further comprising delaying the accesses to the at least one other access performance partition when an access to the first access performance partition is being processed.

12. The method of claim 10 comprising delaying the I/O accesses to the at least one other partition when the I/O accesses to the at least one other partition exceed a predetermined access rate.

13. The method of claim 10 comprising delaying the I/O accesses to the at least one other partition when a data transfer rate to the at least one other partition exceed a predetermined threshold.

14. The method of claim 10 comprising delaying the I/O accesses to the at least one other partition when an average response time of the I/O accesses to the at least one other partition exceed a predetermined threshold.

15. The method of claim 10 further comprising;
    presenting the accesses to the first access performance partition to a first virtual partition;
    presenting the accesses to respective other performance partitions to at least one other virtual partition; and
    converting the respective I/O accesses to respective virtual addresses.

16. The method of claim 15 further comprising converting the virtual addresses to respective physical disk addresses.

17. For use in a direct access storage system, a controller comprising:
    at least one first access performance virtual partition;
    at least one other access performance virtual partition; and
    a governor configured to process I/O accesses to the first access performance partition without regulation and regulate I/O accesses to the at least one other access performance partition such that a predetermined quality of service is managed.

18. The controller of claim 17 further comprising a monitor configured to determine an access rate for the first access performance partition and present a control signal configured to regulate the I/O accesses to the at least one other access performance partition in response to the access rate for the first access performance partition.

* * * * *